United States Patent [19]

Harke et al.

[11] Patent Number: 5,710,204

[45] Date of Patent: Jan. 20, 1998

[54] CASTABLE, CURABLE COMPOSITION FOR PRODUCING PLASTIC MOLDED ARTICLES

[75] Inventors: Stefan Harke, Sinsheim-Rohrbach; Stefanie Grathwohl, Oberderdingen; Rudolf Paternoster, Rinchnach; Thomas Wilhelm, Sulzfeld; Klaus Hock; Werner Fenzl, both of Regen, all of Germany

[73] Assignees: Blanco GmbH & Co. KG, Oberderdingen; Schock & Co. GmbH, Schorndorf, both of Germany

[21] Appl. No.: 718,212

[22] Filed: Sep. 20, 1996

Related U.S. Application Data

[63] Continuation of PCT/EP95/00562 filed Feb. 16, 1995.

[30] Foreign Application Priority Data

Mar. 26, 1994 [DE] Germany ............... 44 10 526.6

[51] Int. Cl.$^6$ .................................................. C08F 2/44

[52] U.S. Cl. ................. 524/494; 524/437; 524/493

[58] Field of Search ............................ 524/494, 493, 524/437

[56] References Cited

FOREIGN PATENT DOCUMENTS 1495296 6/1969 Germany .
2449656 12/1975 Germany .

*Primary Examiner*—Edward J. Cain
*Attorney, Agent, or Firm*—Edward J. Timmer

[57] ABSTRACT

In a castable, curable composition for producing plastic molded articles, comprising a sirup containing a proportion of acrylic acid monomer and/or derivatives thereof, in order to achieve an improved boiling resistance of the plastic molded articles produced from the composition, it is proposed that a proportion of a further component of the formula (I)

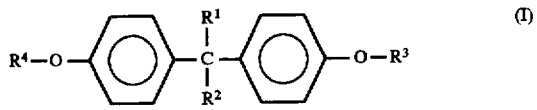

which contains an ethylenically unsaturated group of the formula (II)

$$-R_5-R_6 \qquad (II)$$

and/or contains a group of the formula (III)

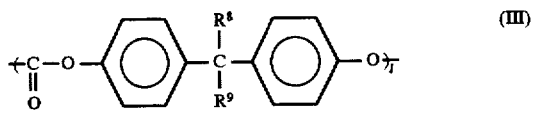

be added. The sirup may also optionally contain a proportion of a prepolymer, in particular PMMA, and, in addition, a particulate, inorganic filler in a proportion of 50 to 90% by weight in relation to the total composition, pigments and a radical initiator system are contained in the sirup. The viscosity of the total composition is ≦100 Pa·s, and the ratio of the sum of the weight content of the acrylic acid monomer and its derivatives to the sum of the weight content of the further component and the weight content of PMMA is 99:1 to 30:70, and, in the presence of PMMA, the ratio of the weight content of the further component to the weight content of the PMMA is at least 5:95.

7 Claims, No Drawings

CASTABLE, CURABLE COMPOSITION FOR PRODUCING PLASTIC MOLDED ARTICLES

This is a continuation of international PCT application No. PCT/EP95/00562, having international filing date of Feb. 16, 1995 which designates the United States.

The invention relates to a castable, curable composition for producing plastic molded articles, comprising a sirup containing a proportion of acrylic acid monomer and/or derivatives thereof as well as a particulate, inorganic filler in a proportion of approximately 50–90% by weight in relation to the total composition, and, optionally, pigments and a radical initiator system.

Such castable, curable compositions, in particular, for the production of functional parts for kitchens and bathrooms, especially kitchen sinks, counter-tops, washbasins, bathtubs etc., are known, for example, from DE 42 49 656 C2 or U.S. Pat. No. 3,827,933.

A decisive factor for the use of the plastic molded articles as functional parts in the kitchen and bathroom is, inter alia, their behavior when they come into contact with hot water, which, in the case of high-quality products, should not lead to any change in their functional properties and, in particular, also not in their appearance.

In the molding compositions commonly used so far, certain amounts of a prepolymeric polymethyl methacrylate (abbreviated in the following to PMMA) were added to the sirup to reduce the shrinkage during curing, to act as binder and to prevent the occurrence of material stresses during curing. With respect to the reduction in shrinkage and the reduction in material stresses in the cured, final molded article, the PMMA additions certainly fulfilled these functions. However, the molded articles displayed an inadequate boiling resistance, in particular, in a dark, pigmented form. The term boiling resistance is to be understood as the tendency of pigmented plastic molded articles to change color, which is tested on the basis of German Industrial Standard DIN 53393 and specified as the deviance of the individual values of brightness, yellow value and red value as so-called "δE" values.

The object of the present invention is to propose a castable, curable composition from which plastic molded articles having considerably improved boiling resistance can be produced.

This object is accomplished in accordance with the invention, in the composition described at the outset, in that apart from the proportion of acrylic acid monomer and/or derivatives thereof, the sirup comprises a proportion of a further component containing one or more compounds of the formula (I):

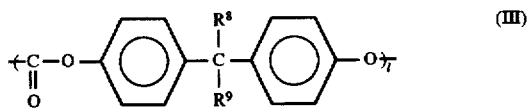

wherein $R^1$ and $R^2$ are the same or different and represent a hydrogen atom, a $C_1$–$C_6$ alkyl group, an aryl group or jointly a cycloalkyl group, and the $C_1$–$C_6$ alkyl group, the aryl group and the cycloalkyl group can be substituted once or several times with a halogen atom, a cyano group, an alkyl group, a hydroxyl group, a carbonyl group and/or a carboxyl group, wherein $R^3$ and $R^4$ are the same or different and a) represent an ethylenically unsaturated group of the formula (II)

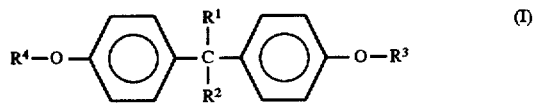

wherein $R^5$ represents a single bond, an ether group of the formula $-(CR_2^7)_m-O-$ (wherein $R^7$ means hydrogen or alkyl and m an integer from 1 to 10) or a polyether group of the formula $-(CH_2-CH_2-O)_n-$ or $-(CH_2-CH_2-CH_2-O)_n-$, and n is an integer from 1 to 6, and wherein $R^6$ represents an at least mono-unsaturated alkylene group with two or more C atoms, an acrylate group or a methacrylate group;

and/or b) represent a group of the formula (III):

$$+C-O-\underset{}{\bigcirc}-\underset{R^9}{\overset{R^8}{C}}-\underset{}{\bigcirc}-O+_l \quad \text{(III)}$$

wherein $R^8$ and $R^9$ are defined like $R^1$ and $R^2$ but independently thereof, and l is an integer from 1 to 10,000, and $R^8$ and $R^9$ can have varying meanings at l>1 in the formula (III), and/or c) represent hydrogen, and at the most one of the residues $R^3$ and $R^4$ is a hydrogen atom, and the sirup optionally including a proportion of a prepolymer, in particular PMMA, and, in addition, containing a particulate, inorganic filler with a proportion of approximately 50 to 90% by weight in relation to the total composition, pigments and a radical initiator system, the viscosity of the total composition being ≦100 Pa·s, and the ratio of the sum of the weight content of the acrylic acid monomer and its monomeric derivatives to the sum of the weight content of the further component and the weight content of PMMA being 99:1 to 30:70, and, in the presence of PMMA, the ratio of the weight content of the further component to the weight content of the PMMA being at least 5:95.

The acrylic acid monomers or their derivatives are to be understood, in particular, as the following derivatives:

Methyl methacrylate, ethyl methacrylate, n-butyl methacrylate, t-butyl methacrylate, ethyl acrylate, butyl acrylate, t-butyl acrylate, 2-ethylhexyl acrylate, ethylene glycol dimethacrylate, trimethylolpropane trimethacrylate, hydroxypropyl methacrylate, hydroxyethyl acrylate, dimethylaminoethyl methacrylate and diethylaminoethyl methacrylate as well as acrylonitrile and methacrylonitrile.

Surprisingly, a considerable improvement in the boiling resistance can be achieved in comparison with hitherto known values with the most suitable PMMA additions by adding a further component according to definition a) and/or the definition according to b). The further component should at least be soluble to a certain extent in the sirup used.

The addition of a further component to the sirup does not, as already explained above, mean that a proportion of PMMA must, for example, be omitted completely but rather the further component replaces the proportion of PMMA used so far either completely or also only partially.

The proportion of PMMA, when present, continues to have the function of reducing the shrinkage of the composition during the curing and thus also reducing the material stresses in the finished product.

The further component, which is optionally ethylenically unsaturated, assumes part of or the whole of the binder function of the PMMA and also its function of reducing the stresses in the finished product and, in addition to this, also improves the boiling resistance of the finished product. The improvement can be observed particularly clearly in dark-colored plastic molded articles, for example, with the color dark brown or anthracite.

Without wishing to commit themselves to this, the inventors of this new curable casting composition proceed on the assumption that a better binding of the plastic matrix to the inorganic fillers results from the inventive addition of the further component which is optionally ethylenically unsaturated.

The following examples give preferred compounds as further, ethylenically unsaturated component, corresponding to definition a):

tetraethoxylated bisphenol A dimethacrylate (obtainable as Diacryl 121 from Akzo Chemicals GmbH, Düren) and diethoxylated bisphenol A dimethacrylate (obtainable as Diacryl 101 from Akzo Chemicals GmbH).

Use of this component alone as partial PMMA substitute results not only in a clearly improved boiling resistance but also in a scratch resistance which is significantly better than in the products produced from conventional, curable casting compositions.

This applies not only to so-called rough-edged scratches which can be made in the material with sharp objects but also to so-called viscoelastic scratches which are caused by blunt objects.

This improvement in the resistance to rough-edged scratches, on the one hand, and viscoelastic scratches, on the other hand, is all the more surprising since parallel results are not normally achievable here.

It is also astonishing that the impact strength of the material remains unchanged even though the partial or even complete substitution of the PMMA portion with the further, ethylenically unsaturated component results in a higher cross-linking density in the product, which is normally opposed by a decrease in the impact strength.

A special bending test also shows improved values, i.e. no hairline cracks are formed when a sample is subjected to nonionic surfactants under bending stress, in contrast to the conventional materials.

The further component which complies with definition b) and, therefore, falls into the group of polycarbonates is represented, by way of example, by the following, specific compounds:

Trimethylcyclohexyl bisphenol polycarbonate homopolymer having a molecular weight of 20,000 to 30,000 and a glass transition point of 238° C. (Bayer AG);

bisphenol A trimethylcyclohexyl bisphenol polycarbonate copolymers having a molecular weight of 20,000 to 30,000 with the ratios of the bisphenol A polycarbonate component (BPA-PC) to the trimethylcyclohexyl bisphenol polycarbonate component (TMC-PC) of:

80:20, glass transition point 174° C. (APEC HT KU-1-9341, Bayer AG)

65:35, glass transition point 187° C. (APEC HT KU-1-9351, Bayer AG)

45:55, glass transition point 205° C. (APEC HT KU-1-9371, Bayer AG)

It is difficult to use pure bisphenol A polycarbonate (Makrolon) in the present invention. The problem with this product is that in MMA it essentially only swells and results in a high viscosity.

This applies in a similar way to polyester carbonates having aromatic ester portions and a carbonate portion on the basis of bisphenol A. In this case, a somewhat better swelling capability is observed, however, the viscosity of the composition is still high, in particular, it does not dissolve completely in MMA.

The polycarbonates can have between 1 and 10,000 structural units, as already defined above. Preferably, the numerical range for the integer 1 is, however, in the range of 3 to 500, ideally between 5 and 100.

Use of the polycarbonates alone as further, ethylenically unsaturated component results in a drastic improvement in the boiling resistance. Advantages such as those obtained with the definition according to a), i.e., also in respect of the scratch resistance, are not observed in this case.

Portions of the further component according to definition a) and definition b) can, of course, be mixed without any problem, and a more or less significant, additional effect is achieved with respect to the scratch resistance, depending on what proportions of the component according to definition a) are present in the mixture.

The filler is preferably used as a finely divided filler, but a proportion of at least 80% by weight of the filler should have a particle size >10 µm.

With a particularly preferred particle size distribution, care is taken to ensure that at least 10% by weight of the filler has a particle size >60 µm.

Preferably, the ratio of the sum of the weight content of the acrylic acid monomer and its monomeric derivatives to the sum of the weight content of the further component and PMMA is selected to be 95:5 to 40:60, and the range of 90:10 to 50:50 is further preferred.

The inorganic filler is often used in silanized form, which facilitates the binding to the plastic matrix. Examples of the inorganic filler, which can be used individually or in combination, are glass, glass beads, quartz, cristobalite, tridymite or other $SiO_2$ modifications as well as aluminum trihydroxide.

Finally, the invention also relates to plastic molded articles which are produced from a castable, curable composition according to the invention, as described above.

These and other advantages will be explained in greater detail in the following on the basis of the examples.

EXAMPLES

1. Method of production used for the plastic molded articles tested:

A casting mold is filled with the curable composition; the mold half corresponding to the visible side of the molded article is first heated to 80° C. and after the filling procedure brought to 100° C. The mold half corresponding to the back of the molded article is likewise heated from 30° C. at the beginning to 100° C. The curing cycle lasts approximately 30 minutes.

A typical mold for a kitchen sink is used as mold and a sample of 10×10 cm is cut out of the bottom of the basin of the molded article produced.

2. Boiling test

The sample from the bottom of the basin obtained as described above is used for the boiling test described in the following. This is carried out with a so-called Bayer lantern. This Bayer lantern corresponds to an apparatus such as that described in German Industrial Standard DIN 53393.

The sample is cut in accordance with the Industrial Standard and clamped. It is thus possible to also test the sample body with loading on one side.

Water at 90° C. is used for the boiling test, and it is ensured that the entire surface of the sample is covered with water. The following test conditions are selected in contrast to the German Industrial Standard DIN 53393:

a) Testing is carried out over a period of 16 hours.

b) The water inlets and outlets of the Bayer lantern are connected to a thermostat with a water supply of 20 l, which regulates the temperature and provides for a constant exchange of water. The thermostat also provides for a throughput of 2 to 3 l/min through the test apparatus.

c) Determination of the "δE" values:

The color of the treated and the untreated sample is measured with a commercially available color measuring device (CR200 of the Minolta company) in the LAB system.

A waiting time of 24 hours prior to measurement of the boiling resistance is then to be strictly observed.

The change in color according to the test is specified as a root of the deviance of the individual values relating to the brightness, the yellow value and the red value as "δE" value which, according to definition, is >0 and constitutes a measurement for the boiling resistance.

3. Scratch resistance test

The scratch resistance was tested according to the following test specification:

Scratches were made with increasing loads of 1 to 10 n in a sample from the bottom of a basin with a hardness and adhesion tester (model 413 of the Erichsen company, Hemer, Germany), with the aid of a diamond needle having a 90° cone and with the aid of a hard metal sphere having a diameter of 0.5 mm. The depth of these scratches was measured with a peak-to-valley measuring device (model T2000 with linear feed unit LV50 of the Hommelwerke company in Villingen-Schwenningen,Germany) and plotted against the load.

4. Viscometry

A viscotester VT501 of the Haake company was used for the viscometries. A so-called suspension tool E30 was used as rotary member for simple relative measurements. The sample was measured at a temperature of 20° C. and a polypropylene beaker having an approximately 200 ml capacity and a diameter of 10 cm was used for the sample. The manufacturer recommends beakers having a diameter which corresponds to four times that of a rotary member (d rotary member=24 mm, d beaker=100 mm). All the measurements were carried out at speed stage 2, i.e. with a rotational speed of 8.3/min or a shearing speed of 0.8 sec$^{-1}$.

Comparative Example 1

2 kg of PMMA (Vedril 9K) are dissolved in 8 kg of MMA and mixed with 200 g of trimethylolpropane trimethacrylate and a mold release agent in the form of conventional soap or stearic acid.

Then 17.4 kg of a commercial cristobalite powder (particle size distribution: approximately 80% by weight >10 μm and approximately 20% by weight >60 μm) are added as filler so that a filler content of approximately 63% by weight in relation to the total composition is achieved.

In addition, a brown pigment as well as peroxide as initiator are added, and the composition is cured in accordance with the aforementioned specification in a mold cavity for a typical kitchen sink.

The viscosity of the curable casting composition was approximately 2 Pa·s and this composition was very easy to work.

A "δE" value of 5.16 is obtained as boiling resistance test result.

Comparative Example 2

If PMMA of the Degussa company with the trade name LP51/03 is used in the formula of Comparative Example 1 with the composition otherwise unchanged, an improved boiling resistance value of "δE"=3.14 is obtained.

Example 1

Instead of the PMMA used in Comparative Examples 1 and 2, 2 kg of a high-temperature resistant polycarbonate of the type Apec HT KU-1-9371 of the Bayer AG company with a glass transition point of 205° C. is used as further component in the present case. This polycarbonate is dissolved in 8 kg of MMA and mixed with 200 g of trimethylolpropane trimethacrylate as cross-linker as well as a mold release agent in the form of a conventional soap or stearic acid. Subsequently, 17.4 kg of a commercial cristobalite powder (particle size distribution as in Comparative Example 1) are added as above as filler so that a filler content of 63% by weight is attained. In addition, brown pigment and peroxide as initiator are added and the composition is poured into a conventional mold cavity. The composition is cured in accordance with the aforementioned specification.

The viscosity of the composition according to Example 1 was approximately 6 Pa·s; the composition was very easy to work.

The result of the boiling resistance test was a "δE" value of 1.65, i.e. it was possible to improve the boiling resistance value by almost the factor 2, in comparison with the particularly good PMMA type LP51/03 (Comparative Example 2).

Example 2

A sirup is produced from 1 kg of PMMA of the type Vedril 9K, 4 kg of MMA and 5 kg of Diacryl 101 (Akzo Chemicals GmbH) as further component as well as 200 g of trimethylolpropane dimethacrylate as cross-linker. 17.2 kg of the cristobalite powder mentioned in Comparative Example 1 are added thereto so that the filler content is 63% by weight of the total composition. Pigments and peroxides are also added, as in the previous examples.

The viscosity of the workable composition is 10 Pa·s; the composition is very easy to work.

A sensational "δE" value of 0.46 is obtained as boiling resistance value.

The Diacryl used in this case can also be understood as a cross-linker of a comparably low cross-linking density. Within the scope of this embodiment, it is to be emphasized that not only is the boiling resistance drastically improved but also the scratch resistance of the product thus obtained is considerably better than in the Comparative Example described above. Penetration of the various tools is considerably impeded. It is unusual that an improvement was achievable with both tools, i.e. with the diamond which produces rough-edged scratches as well as with the sphere which produces viscoelastic scratches (cf. Table 1).

TABLE 1

| Diamond<br>Load (n)<br>Scratch depth (μm) | 10 | 9 | 8 | 7 | 6 | 5 | 4 | 3 |
|---|---|---|---|---|---|---|---|---|
| Example 2 | 10 | 9 | 8 | 5 | 4 | 3 | 2 | 1 |
| Comparative Example | 18 | 15 | 13 | 12 | 8 | 4 | 2 | 2 |
| Sphere<br>Scratch depth (μm)<br>Example 2 | 1.0 | 0.9 | 0.7 | — | — | | | |
| Comparative Examples 1 and 2 | 2.0 | 1.4 | 1.0 | 1.0 | 1.0 | | | |

Apart from the extremely good boiling resistance value, an unchanged impact strength is also observed although one would expect a decrease owing to the increased cross-linking density.

The formula specified in Example 1 may be varied as follows (the same applies to Example 2):

If a composition with a low viscosity is to be used, 5 kg of sirup according to Example 1 can be mixed, for example, with 5 kg of Diacryl 101, and 15 kg of the specified cristobalite powder added to this mixture. A viscosity of 1.9 Pa·s is obtained. This composition is easy to work.

If, in this variant of the formula, the proportion of cristobalite powder is increased to 23 kg, the viscosity of the total composition increases to 22 Pa·s, and it is still possible to work the composition.

With an increase in the proportion of the cristobalite powder to 40 kg, the viscosity of the total composition is increased to considerably more than 100 Pa·s, and it is no longer possible to work the composition.

From a viscosity of approximately 80 Pa·s upwards it is extremely difficult to introduce the inventive composition into a casting mold, and, therefore, viscosities ≦60 Pa·s are preferably used.

We claim:

1. Castable, curable composition for producing plastic molded articles, comprising a sirup containing a proportion of acrylic acid monomer and/or derivatives thereof and a proportion of a further component containing one or more compounds of the formula (I):

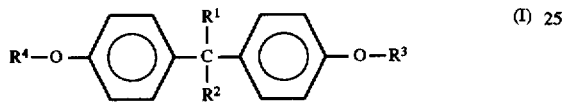

(I)

wherein $R^1$ and $R^2$ are the same or different and represent a hydrogen atom, a $C_1$–$C_6$ alkyl group, an aryl group or jointly a cycloalkyl group, and the $C_1$–$C_6$ alkyl group, the aryl group and the cycloalkyl group can be substituted once or several times with a halogen atom, a cyano group, an alkyl group, a hydroxyl group, a carbonyl group and/or a carboxyl group, wherein $R_3$ and $R_4$ are the same or different and a) represent an ethylenically unsaturated group of the formula (II)

(II)

wherein $R_5$ represents a single bond, an ether group of the formula —$(CR_2^7)_m$—O— (wherein $R^7$ means hydrogen or alkyl and m an integer from 1 to 10) or a polyether group of the formula —$(CH_2$—$CH_2$—$O)_n$— or —$(CH_2$—$CH_2$—$CH_2$—$O)_n$—, and n is an integer from 1 to 6 and, wherein $R^6$ represents an at least mono-unsaturated alkylene group with two or more C atoms, an acrylate group or a methacrylate group;

and/or b) represent a group of the formula (III):

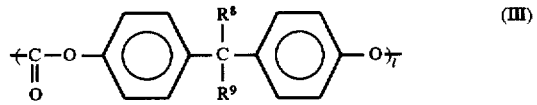

(III)

wherein $R^8$ and $R^9$ are defined like $R^1$ and $R^2$, but independently thereof, and l is an integer from 1 to 10,000, and $R^8$ and $R^9$ can have varying meanings at l>1 in the formula (III), and/or c) represent hydrogen, and at the most one of the residues $R^3$ and $R^4$ is a hydrogen atom, and the sirup optionally including a proportion of a prepolymer, in particular polymethyl methacrylate (PMMA), and, in addition, containing a particulate, inorganic filler with a proportion of approximately 50 to 90% by weight in relation to the total composition, pigments and a radical initiator system, the viscosity of the total composition being ≦80 Pa·s, and the ratio of the sum of the weight content of acrylic acid monomer and its monomeric derivatives to the sum of the weight content of the further component and the weight content of prepolymer being 99:1 to 30:70, and, in the presence of prepolymer, the ratio of the weight content of the further component to the weight content of the prepolymer being at least 5:95.

2. Castable composition as defined in claim 1, characterized in that the particle size distribution of the inorganic filler is selected such that at least 80% by weight of the filler has a particle size >10 μm.

3. Castable composition as defined in claim 1, characterized in that the particle size distribution of the inorganic filler is selected such that at least 10% by weight of the filler has a particle size >60 μm.

4. Castable composition as defined in claim 1, characterized in that the ratio of the sum of the weight content of the acrylic acid monomer and its monomeric derivatives to the sum of the weight content of the further component and PMMA is from 95:5 to 40:60, further preferred from 90:10 to 50:50.

5. Castable composition as defined in claim 1, characterized in that the inorganic filler is silanized.

6. Castable composition as defined in claim 1, characterized in that the inorganic filler comprises individually or in combination glass, glass beads, quartz, cristobalite, tridymite or other $SiO_2$ modifications as well as aluminum trihydroxide.

7. Plastic molded article produced from a castable, curable composition according to claim 1.

* * * * *

UNITED STATES PATENT AND TRADEMARK OFFICE
CERTIFICATE OF CORRECTION

PATENT NO. : 5 710 204
DATED : January 20, 1998
INVENTOR(S) : Stefan HARKE, et al It is certified that error appears in the above-indentified patent and that said Letters Patent is hereby corrected as shown below:

On the title page, Abstract item [56];
formula (II) replace "$-R_5-R_6$" with ----$R^5-R^6$----.
Column 1, line 67, replace "$R_5-R_6$" with ---$R^5-R^6$---.
Column 7, line 36, replace "$R_3$ and $R_4$" with ---$R^3$ and $R^4$---.
Column 7, line 43, replace "$-R_5-R_6$" with ----$R^5-R^6$---.
Column 7, line 44, replace "$R_5$" with ---$R^5$---.

Signed and Sealed this

Twenty-fifth Day of August, 1998

Attest:

BRUCE LEHMAN

Attesting Officer

Commissioner of Patents and Trademarks